No. 792,072. PATENTED JUNE 13, 1905.
O. PRICE & W. GASTON.
BOLT DOGGING MEANS FOR SAFES OR VAULTS.
APPLICATION FILED APR. 11, 1904.

3 SHEETS—SHEET 1.

Witnesses:
G. G. Fuss.
F. E. Maynard.

Inventors:
Orvey Price,
Walter Gaston,
By their attorney,
F. H. Richards.

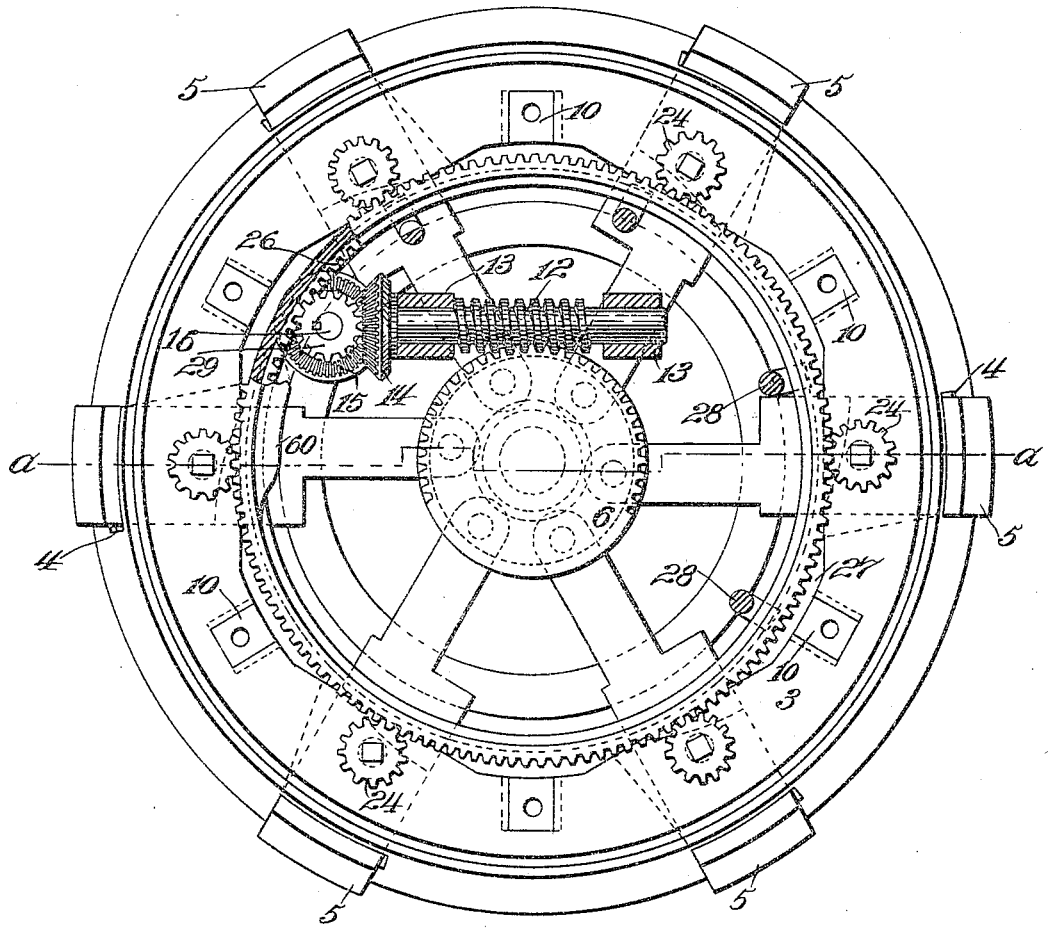
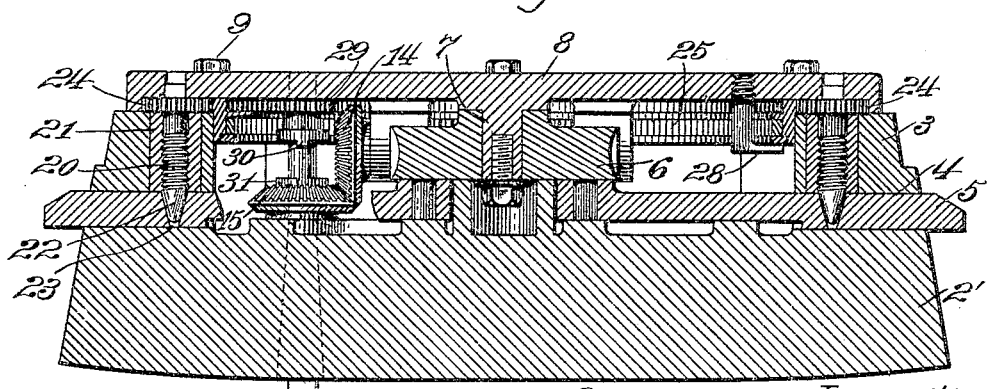

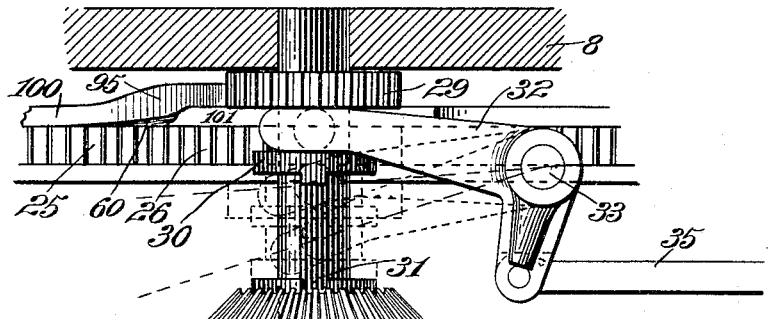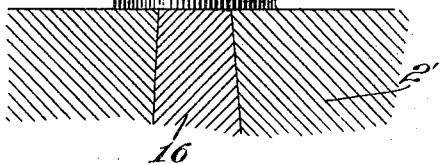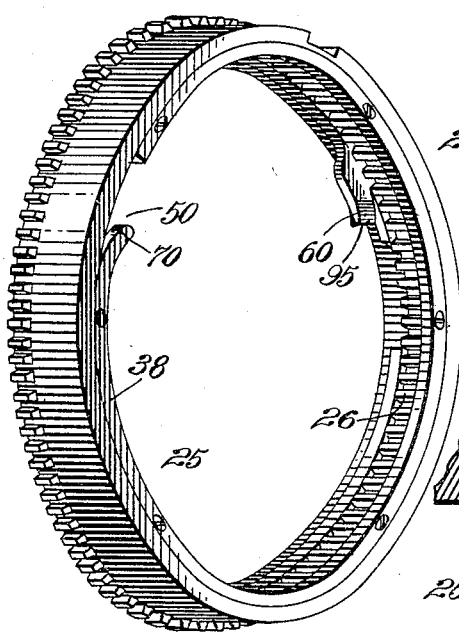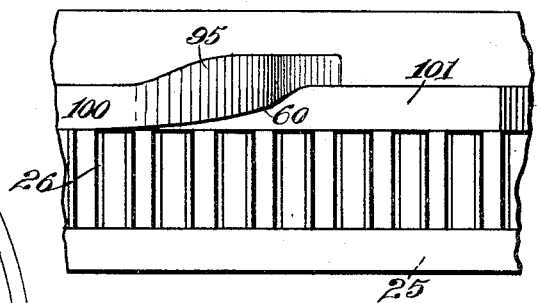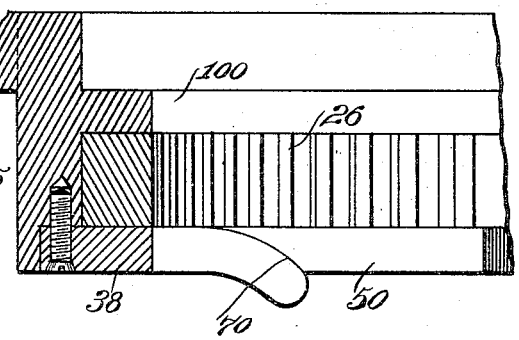

No. 792,072. Patented June 13, 1905.

UNITED STATES PATENT OFFICE.

ORVEY PRICE AND WALTER GASTON, OF PLAINFIELD, NEW JERSEY, ASSIGNORS, BY DIRECT AND MESNE ASSIGNMENTS, TO TAYLOR IRON & STEEL COMPANY, OF HIGHBRIDGE, NEW JERSEY, A CORPORATION OF NEW JERSEY.

BOLT-DOGGING MEANS FOR SAFES OR VAULTS.

SPECIFICATION forming part of Letters Patent No. 792,072, dated June 13, 1905.

Application filed April 11, 1904. Serial No. 202,491.

*To all whom it may concern:*

Be it known that we, ORVEY PRICE and WALTER GASTON, residing at Plainfield, in the county of Union and State of New Jersey, citizens of the United States, have invented certain new and useful Improvements in Bolt-Dogging Means for Safes or Vaults, of which the following is a specification.

This invention relates to bolt dogging or locking means for safes or vaults, the object of the invention being to provide an improved means or system for dogging safe or vault door locking bolts.

A further object of the invention is the provision of improved bolting mechanism in which the same means which operates the bolts to throw or retract them also controls the locking or dogging of such bolts.

A further object of the invention is the provision of a safe or vault bolting system simple in its construction and organization and effective in operation and comprising radially-acting door-locking bolts and dogging means in the form of intersecting bolts, both such bolts being controlled by the same actuating means.

Figure 1:
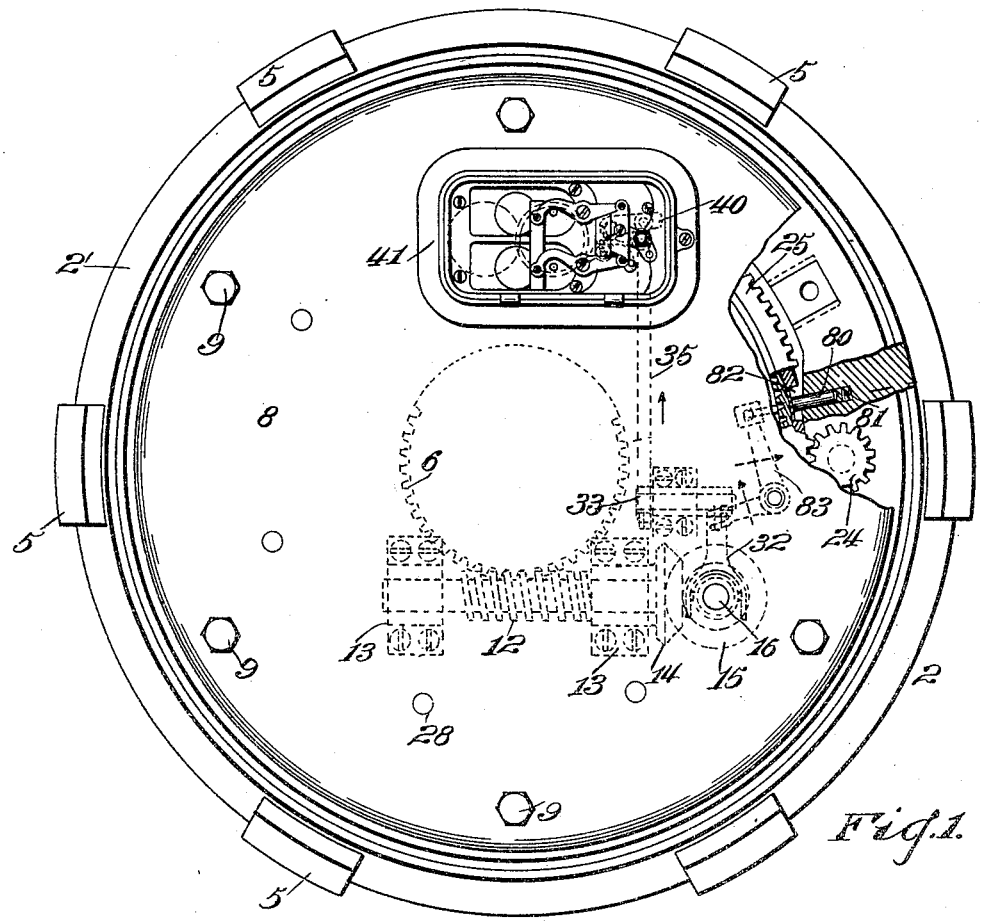
Figure 8:
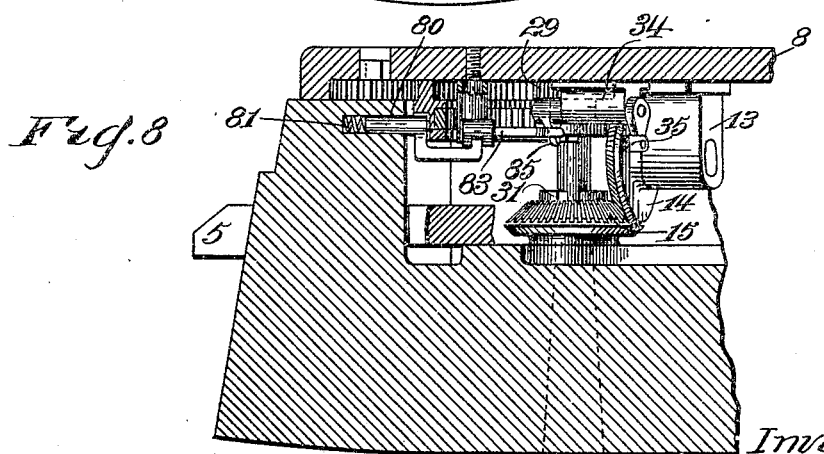

In the drawings accompanying and forming part of this specification, Figure 1 is a rear view of the door with a part of the back-plate broken away and a part of the mechanism shown in dotted lines, the bolts being protracted. Fig. 2 is also a rear view of the door with the back-plate removed. Fig. 3 is a cross-sectional view taken in line $a\ a$, Fig. 2, with the back-plate, however, in position. Fig. 4 is a detail view of a part of the means for manipulating the dogging mechanism. Fig. 5 is a perspective view of the rotary ring for operating the dogging-bolts. Figs. 6 and 7 are enlarged sectional detail views of parts of this ring, and Fig. 8 is a sectional detail view illustrating the detent for locking the ring against movement.

Similar characters of reference designate corresponding parts in the different figures of the drawings.

In practice it has been found that radially-acting locking-bolts are very effective not only to draw the door to its seat firmly, so as to wedge the same therein, but to prevent ingress into the safe or vault by means of nitroglycerin or other explosives, and that this effectiveness is increased by the use of a worm mechanism, such as shown and described in several of Henry D. Hibbard's patents, for manipulating such bolt mechanism. It is, however, desirable that such bolt mechanism shall be dogged or locked against retraction, so that the bolts cannot be worked or jarred loose or retracted by vibration. To accomplish this object, we have provided improved means for dogging such bolts and which means is effective to lock the bolts in their protracted positions notwithstanding the entire operating means, the back-plate, and other parts should be entirely dislocated by explosive charges.

The door 2 may be of various constructions; but in the preferred form shown it is an integral circular structure comprising a body 2' and a flange 3, the latter having bolt-openings 4 for the passage of the radial bolts 5, which are pivoted at their inner ends to a worm-wheel 6, mounted upon a stud 7 of a back-plate 8, which is bolted to the flange of the door by means of bolts 9 inserted in soft-metal inserts 10, located in the flange when the material of the door is of unmachineable metal—such, for instance, as manganese steel. For rotating this worm-wheel a worm-shaft 12 is provided, suitably journaled in brackets 13, carried by the back-plate, and on one end of which is fixed a bevel-gear 14, rotatable with the worm-shaft and which is in mesh with a bevel-gear 15, loosely mounted on a tapered spindle or actuator 16, projecting through the door.

The mechanism so far described is substantially similar to that shown and described in the several patents to H. D. Hibbard, hereinbefore referred to.

For locking the bolts against retraction we have provided one or more intersecting bolts 20, preferably one for each radially-shiftable bolt. Less than this number could be used, however, if desired. Each of these bolts is threaded into a soft-metal insert or plug 21, cast into the flange of the door, the inner end 22 of such bolt being conical or tapered to fit into a conical or tapered opening 23, formed in the radial bolts, preferably in the head thereof, this being sufficiently large for this purpose. The upper end of each of these intersecting bolts is provided with a pinion 24 to rotate it, so as to protract it into engagement with one of the radiably-shiftable bolts or to retract it therefrom to permit such radially-shiftable bolt to be moved. For rotating these dogging-bolts we have provided a rotatable member 25 in the form of a gear-ring, which is shown as a duplex gear-ring, one series of teeth being exteriorly located and in this instance in engagement with the pinions 24 of the dogging-bolts, while the other series of teeth 26 is located on the interior of such ring. This ring fits within the door-flange, which is cut away at certain parts 27 around the same, so that the ring engages but a comparatively small part of such flange, thus decreasing its frictional resistance to rotation, such ring being secured to the back plate by a series of fastening devices 28, but so formed that the ring may be rotated relatively to the back plate to rotate the dogging-bolts. For rotating this ring a gear 29 is provided, fixed to or formed as a part of a splined clutch member 30, which clutch member coöperates with a clutch member 31, fixed to or formed as a part of the loosely-mounted bevel-gear 15, mounted on the bolting-spindle 16, the inner end of which projects into the back plate. This splined clutch member and its pinion is shiftable upon said spindle by means of a clutch device 32, the inner end of which is fixed to a rock-shaft 33, carried by a bracket 34, secured to the back plate. The opposite end of this rock-shaft is in connection, by means of a lever 35, with a member (shown herein as a bolt 40) of the combination-lock 41, whereby when the dial is rotated and the tumblers set to operate this bolt 40 the clutch-shifter will be moved to shift the gear 29 and its clutch member 30 first into engagement with the rotary ring 25 and then subsequently into position to have the splined clutch member 30 engage the clutch member 31, carried by the loosely-mounted bevel-gear, so that the radially-shiftable bolts can be withdrawn. This is accomplished in the following manner: In the position shown in Fig. 4 the gear 29 is in its normal position above the teeth of the ring 25, while the radially-acting bolts are protracted, so that the door is locked in position with the dogging-bolts in engagement with such radial bolts to prevent retraction thereof. On the proper manipulation of the combination-lock when the time-lock has run down, if a time-lock is used to dog the combination-lock, the tumblers are rotated and set to shift the bolt 40 of the combination-lock 41 in the usual manner. This bolt 40, moving in the direction of the arrow, rocks the rock-shaft 33, to which the clutch-shifter is fixed, and so moves the gear 29 on the bolting-spindle into position to engage the teeth of the gear-ring 25, further downward movement of the gear 29 at this time being prevented by a flange 38, secured to the ring. When this position has been reached, it being determined by "feeling" for it by the operator, the bolting-spindle 16 is then turned by its crank, (the operator at the same time keeping the dial of the combination-lock under pressure,) whereupon on the rotation of this spindle the gear-ring will be turned to rotate the dogging-bolts and withdraw them from the radial bolts, and so unlock them. When this has been completely effected, the rotary ring has been so shifted that the recess 50 in the flange 38 thereof is brought into such position that continued pressure on the dial of the combination-lock will further rotate the tumblers thereof, the fence projecting, as usual, into the alined notches of such tumblers and by this means further shifting the bolt 40, which further moves the clutch-shifter, so as to move the gear 29 downwardly below the toothed ring, carrying the clutch member 30 of said gear 29 into engagement with the loosely-mounted clutch member 31, carried by the bevel-gear. When this takes place, further turning of the bolting-spindle 16 rotates the bevel-gear of the worm-shaft, whereupon the radial bolts will be retracted, as will be readily understood. A reverse of this manipulation of the parts after the radial bolts have been protracted—to wit, first the disengagement of the clutch members and the moving of the splined gear 29 upward into engagement with the teeth of the ring, a flange 100 limiting further movement at this time, and then the continued turning of the bolting-spindle backward—will rotate the dogging-bolts to again engage the radial bolts and lock them against retraction. A further shifting of the gear 29 upward by means of the dial of the combination-lock when the rotary bolts have been shot home, at which time the gear 29 has reached the opening 101 in the flange 100, returns such gear to its normal position. (Shown in Fig. 4.)

The proper manipulation of the several parts is obtained by the operator feeling, as it were, the various positions of the parts. Should, however, the dial, and thereby the bolt, of the combination-lock not be sufficiently operated to throw the gear 29 into complete mesh with the teeth of the gear-ring, the cam-surface 60, carried by the ring, coming into engagement with the gear will shift it into proper mesh with the teeth, and this is also true of the cam-surface 70 when the gear is being thrown back or upward after the radial bolts have been protracted.

For the purpose of preventing the ring-gear from being turned by vibration or otherwise a locking-detent 80 is provided, which under the action of its spring 81 is constantly maintained in engagement with the ring, one end thereof being located in a recess 82 of said ring, so that as long as such detent is in its locking position the ring cannot be rotated. In order that this detent may be moved out of the way when it is desired to rotate the ring, means are provided for this purpose, which in the present instance comprises a bell-crank 83, one end of which is in engagement with one end of the detent, which in the present instance is so shaped that it will project below the edge of the ring, while the other end of this bell-crank is in engagement with a depending portion or arm 85 of the clutch-shifter, so that as the clutch-shifter 32 is moved in the manner hereinbefore indicated the arms of the bell-crank will be thrown in the direction of the arrows, and thus push the detent 80 inwardly against the action of its spring 81 and so release it from the ring and permit such ring to be rotated.

If for any reason the detent should fail to properly work, the turning of the ring beyond a predetermined position is still prevented by means of a stop 95, carried by the ring, which comes into engagement with the gear 29, so that so long as the pinion remains in the position shown in Fig. 4 the further turning of the ring would be impossible.

In conclusion it is to be understood that the various details may be more or less changed without departing from the spirit or scope of this invention. For instance, if found desirable a soft-metal ring for the dogging-bolts could be used instead of a series of soft-metal inserts.

We claim as our invention—

1. A safe or vault door bolting mechanism comprising a plurality of locking-bolts, dogging means comprising one or more rotatable bolts each directly engaging a locking-bolt, and means permanently connected with the door for operating said dogging bolt or bolts.

2. A safe or vault door bolting mechanism comprising a plurality of locking-bolts shiftable lengthwise in different directions, dogging means for said bolts and comprising a plurality of threaded, rotary bolts directly engaging the locking-bolts, and means including gearing for actuating said dogging-bolts.

3. A safe or vault door bolting mechanism comprising a plurality of locking-bolts, dogging means therefor comprising one or more rotary bolts, each directly engaging a locking-bolt, and gearing for operating said dogging bolt or bolts.

4. A safe or vault door bolting mechanism comprising locking-bolts, dogging means for said bolts, comprising a plurality of rotary bolts, each directly penetrating a main bolt, and rotary means for simultaneously operating all of said dogging-bolts.

5. A safe or vault door bolting mechanism comprising a series of main bolts, one or more at each side of the door, a plurality of dogging-bolts, one directly penetrating each of said main bolts transversely to their plane of movement each time the main bolts are shot home and means for operating said dogging-bolts.

6. A safe or vault door bolting mechanism comprising a plurality of locking-bolts shiftable in different directions, a plurality of rotatable dogging-bolts each directly engaging a locking-bolt transversely to its plane of movement, and means for simultaneously shifting all of said dogging-bolts.

7. A safe or vault door bolting mechanism comprising a plurality of main bolts connected for simultaneous movement in different directions around the door, dogging means therefor comprising a plurality of rotatable bolts directly engaging a plurality of the main bolts transversely to their plane of movement, and means for operating said dogging-bolts to release said main bolts.

8. A safe or vault door bolting mechanism comprising a plurality of radially-shiftable bolts and means for dogging said bolts and comprising a plurality of rotatable bolts, one for each of said radially-shiftable bolts and means for rotating said dogging-bolts.

9. A safe or vault door bolting mechanism, comprising a plurality of radially-shiftable main bolts, dogging means for locking said bolts against retraction and comprising one or more rotary bolts intersecting said main bolts transversely of their plane of movement, and means for shifting said radial bolts, said means forming a part of the mechanism for operating said dogging-bolts.

10. A safe or vault door bolting mechanism comprising a plurality of radially-shiftable bolts, means for dogging said bolts and comprising a plurality of rotatable bolts, one for each of said radially-shiftable bolts, and means for shifting said radial bolts, said means forming part of the mechanism for actuating said rotary dogging-bolts.

11. A safe or vault door bolting mechanism comprising a plurality of shiftable bolts, dogging means for said bolts comprising one or more rotary bolts, a gear-ring for rotating said rotatable bolt or bolts, a gear in engagement therewith, and a spindle for rotating said gear.

12. A safe or vault door bolting mechanism comprising a plurality of shiftable bolts, dogging means for said bolts comprising one or more rotary bolts, a gear-ring for rotating said rotatable bolt or bolts, a gear in engagement therewith, a spindle for rotating said gear and means for throwing said gear into and out of engagement with said gear-ring.

13. A safe or vault door bolting mechanism comprising a plurality of shiftable bolts, dogging means for said bolts comprising one or more rotatable bolts, a gear-ring for rotating said rotatable bolt or bolts, a gear in engagement therewith, a spindle for rotating said gear, and means for controlling the operation of the shiftable door-locking bolts and including clutch mechanism.

14. A safe or vault door bolting mechanism comprising a plurality of radially-shiftable bolts, dogging means for said bolts comprising one or more rotatable bolts, gear mechanism for shifting said radial bolts, gear mechanism for rotating said dogging-bolts and means effective at one time to insure the operation of the rotatable dogging-bolts and at another time to insure the operation of the radial bolts.

15. A safe or vault door bolting mechanism, comprising a plurality of radially-shiftable bolts, dogging means for said bolts comprising one or more rotatable bolts each having a pinion, gearing for shifting said radial bolts, a spindle, a loosely-mounted gear upon said spindle and in mesh with a part of the gearing for shifting said radial bolts, a gear-ring in engagement with the pinions of the rotatable bolts, a gear in engagement with said gear-ring and shiftably splined to said spindle, and shiftable into one position to rotate said gear and thereby the rotatable bolts, and into another position to coöperate with the loosely-mounted gear upon the said spindle and insure, on the rotation of said spindle, the retraction and protraction of the radial bolts, and means for shifting said gear.

16. A safe or vault door bolting mechanism comprising a plurality of shiftable bolts, means for dogging said bolts, comprising one or more rotatable bolts, each having a pinion secured thereto, a rotatable gear-ring for rotating said rotatable bolts, a spindle, a gear carried by said spindle and adapted to mesh with said gear-ring and effective on the rotation of the spindle at a predetermined period to rotate the rotatable bolts, and means for shifting the door-locking bolts and including means carried by said spindle for controlling the operation thereof.

17. A safe or vault door bolting mechanism comprising a plurality of shiftable bolts, means for dogging said bolts and comprising one or more rotatable bolts, gearing for rotating said rotatable bolts, and a spindle for imparting movement to said gearing.

18. A safe or vault door bolting mechanism comprising a plurality of radially-shiftable bolts, means for dogging said bolts and comprising one or more rotatable bolts, gearing for rotating said rotatable bolts, a spindle for imparting movement to said gearing and gearing for shifting said radial bolts.

19. A safe or vault door bolting mechanism comprising a plurality of radially-shiftable bolts, means for dogging said bolts and comprising one or more rotatable bolts, gearing for rotating said rotatable bolts, a spindle for imparting movement to said gearing, and gearing for shifting said radial bolts, a part thereof carried by said spindle.

20. A safe or vault door bolting mechanism comprising a plurality of radially-shiftable bolts, means for dogging said bolts and comprising one or more rotatable bolts, gearing for rotating said rotatable bolts, a spindle for imparting movement to said gearing, and means shiftable upon said spindle for controlling the operation of the rotatable bolts and of the radially-movable bolts.

21. A safe or vault door bolting mechanism comprising a plurality of radially-shiftable bolts, means for dogging said bolts comprising one or more rotatable bolts, a spindle, means for operating said radial bolts, means for operating said rotatable bolts, and means carried by said spindle and effective to control the operation of said radial bolts and of said rotatable bolts at predetermined periods on the operation of said spindle.

22. A safe or vault bolting mechanism comprising a plurality of radially-shiftable bolts, means for dogging said bolts, comprising one or more rotatable bolts, a spindle, means for operating said radial bolts, means for operating said rotatable bolts, and means carried by said spindle and effective to control the operation of said radial bolts and of said rotatable bolts at predetermined periods on the operation of said spindle, said means including clutch mechanism.

23. A safe or vault door bolting mechanism comprising a plurality of radially-shiftable bolts, means for dogging said bolts and comprising one or more rotatable bolts each having a pinion fixed thereto, a gear-ring in mesh with said pinions, a worm-wheel connected with said radial bolts, a worm-shaft in mesh therewith, a bevel-gear fixed to said worm-shaft, a spindle, a bevel-gear loosely mounted upon said spindle and carrying a clutch member, a shiftable clutch member splined to said spindle and carrying a gear in mesh with said gear-ring and effective on the operation of said spindle at one period to rotate the gear-ring, and effective on the operation of said spindle at another period to protract or withdraw the radial bolts, and clutch-shifting mechanism for moving said shiftable clutch member.

24. A safe or vault door bolting mechanism comprising a plurality of radially-shiftable bolts, means for dogging said bolts and comprising a plurality of rotatable bolts one for each radial bolt and each having a pinion fixed thereto, a gear-ring in mesh with said pinions, a worm-wheel connected with said rotatable bolts, a worm-shaft in mesh therewith, a bevel-gear fixed to said worm-shaft, a spindle, a bevel-gear loosely mounted upon said spindle and carrying a clutch member, a shiftable clutch member splined to said spindle and carrying a gear in mesh with said gear-ring and effective on the operation of said spindle at one period to rotate the gear-ring, and effective on the operation of said spindle at another period to protract or withdraw the radial bolts, a clutch-shifter for moving said shiftable clutch member, a lock, and means connected therewith for controlling said clutch-shifter.

25. A safe or vault door bolting mechanism comprising a plurality of radially-shiftable bolts, means for dogging said bolts and comprising a plurality of rotatable bolts penetrating said bolts transversely of their plane of movement one for each radial bolt and each having a pinion fixed thereto, a gear-ring in mesh with said pinions, means for preventing movement of said gear-ring, a worm-wheel connected with said rotatable bolts, a worm-shaft in mesh therewith, a bevel-gear fixed to said worm-shaft, a spindle, a bevel-gear loosely mounted upon said spindle and carrying a clutch member, a shiftable clutch member splined to said spindle and carrying a gear in mesh with said gear-ring and effective on the operation of said spindle at one period to rotate the gear-ring, and effective on the operation of said spindle at another period to protract or withdraw the radial bolts, a clutch-shifter for moving said shiftable clutch member, a lock, and means connected therewith for controlling said clutch-shifter.

26. A safe or vault door bolting mechanism comprising a plurality of radially-shiftable bolts, means for dogging said bolts and comprising a plurality of rotatable bolts one for each radial bolt and each having a pinion fixed thereto, a gear-ring in mesh with said pinions, means for limiting the movement of said gear-ring, a worm-wheel connected with said rotatable bolts, a worm-shaft in mesh therewith, a bevel-gear fixed to said worm-shaft, a spindle, a bevel-gear loosely mounted upon said spindle and carrying a clutch member, a shiftable clutch member splined to said spindle and carrying a gear in mesh with said gear-ring and effective on the operation of said spindle at one period to rotate the gear-ring, and effective on the operation of said spindle at another period to protract or withdraw the radial bolts, a clutch-shifter for moving said shiftable clutch member, a lock, and means connected therewith for controlling said clutch-shifter.

27. A safe or vault door bolting mechanism comprising a plurality of radially-shiftable bolts, means for dogging said bolts and comprising a plurality of rotatable bolts one for each radial bolt each having a pinion fixed thereto, a gear-ring in mesh with said pinions, means for preventing the movement of said gear-ring, and means for limiting the movement thereof should the same become prematurely unlocked, a worm-wheel connected with said rotatable bolts, a worm-shaft in mesh therewith, a bevel-gear fixed to said worm-shaft, a spindle, a bevel-gear loosely mounted upon said spindle and carrying a clutch member, a shiftable clutch member splined to said spindle and carrying a gear in mesh with said gear-ring and effective on the operation of said spindle at one period to rotate the gear-ring, and effective on the operation of said spindle at another period to protract or withdraw the radial bolts, a clutch-shifter for moving said shiftable clutch member, a lock, and means connected therewith for controlling said clutch-shifter.

28. A safe or vault door bolting mechanism comprising a plurality of radially-shiftable bolts, means for dogging said bolts and comprising a plurality of rotatable bolts one for each radial bolt and each having a pinion fixed thereto, a gear-ring in mesh with said pinions, means for preventing movement of said gear-ring, a worm-wheel connected with said rotatable bolts, a worm-shaft in mesh therewith, a bevel-gear fixed to said worm-shaft, a spindle, a bevel-gear loosely mounted upon said spindle and carrying a clutch member, a shiftable clutch member splined to said spindle and carrying a gear in mesh with said gear-ring, and effective on the operation of said spindle at one period to rotate the gear-ring, and effective on the operation of said spindle at another period to protract or withdraw the radial bolts, a clutch-shifter for moving said shiftable clutch member, a lock, means connected therewith for controlling said clutch-shifter, and means operative on the movement of said clutch-shifter for rendering the means for preventing movement of the ring ineffective.

29. A safe or vault door bolting mechanism comprising a plurality of main bolts connected for simultaneous movement, threaded rotatable bolts for locking said main bolts against movement, and means for operating said rotatable bolts simultaneously.

30. A safe or vault door having one or more metal inserts located therein, shiftable bolts carried by said door, one or more threaded bolts located in said metal inserts for engaging said shiftable bolts, and means for rotating said threaded bolts.

31. An unmachineable safe or vault door having one or more soft-metal inserts located therein, a plurality of shiftable bolts one or more having conical openings, one or more threaded rotatable dogging-bolts located in said soft-metal inserts and having conical ends adapted to project into the conical openings of said shiftable bolts, and means for rotating said threaded bolts.

32. An unmachineable safe or vault door having one or more soft-metal inserts located therein, a plurality of shiftable bolts, one or more threaded rotatable dogging-bolts located in said soft-metal inserts and adapted to project into openings in said shiftable bolts, and gear mechanism for rotating said threaded bolts.

33. An unmachineable safe or vault door having a plurality of shiftable bolts and a series of soft-metal inserts located in said door, a plurality of threaded dogging-bolts, one threaded into each of said soft-metal inserts, each of said dogging-bolts having a conical or tapered end effective to engage a corresponding opening in one of said shiftable bolts, and each of said bolts having a pinion, a rotatable gear-ring carried by said door and engaging said pinions, a spindle mounted in said door, and a gear carried by said spindle for rotating said ring.

34. An unmachineable safe or vault door having a plurality of radially-shiftable bolts and a series of soft-metal inserts located in said door, a plurality of threaded dogging-bolts, one threaded into each of said soft-metal inserts, each of said dogging-bolts having a conical or tapered end effective to engage a corresponding opening in one of said radial bolts, and each of said bolts having a pinion, a rotatable gear-ring carried by said door and engaging said pinions, a spindle mounted in said door, a gear carried by said spindle for rotating said ring, and means for shifting said gear in and out of engagement with said gear-ring.

35. A safe or vault door bolting mechanism comprising a plurality of radially-shiftable bolts, means for dogging said bolts and comprising a plurality of rotatable bolts, gearing including a gear-ring for operating said rotatable bolts, a spindle, a gear thereon for rotating said gear-ring, and means for shifting said gear into and out of engagement with said gear-ring and for maintaining it out of engagement therewith.

36. A safe or vault door bolting mechanism comprising a plurality of shiftable bolts, means for dogging said bolts and comprising one or more rotatable bolts, gearing including a gear-ring for operating said rotatable bolts, a spindle, a gear thereon for rotating said gear-ring, a clutch-shifter for moving said gear into and out of engagement with said gear-ring and a combination-lock for controlling the movement thereof.

37. A safe or vault door bolting mechanism comprising a plurality of shiftable bolts, means for dogging said bolts, and comprising one or more intersecting bolts, a spindle, means for actuating said dogging-bolts, a part of said means mounted upon said spindle and operative thereby, and means for shifting said part into and out of its operative position.

38. The combination of safe or vault door bolting mechanism, dogging means therefor, a gear-ring for actuating said dogging means, and means for shifting said gear-ring.

39. The combination of safe or vault door bolting mechanism, comprising locking-bolts shiftable in different directions, dogging means comprising one or more dogging-bolts each engaging a locking-bolt, a gear-ring for shifting said dogging bolt or bolts, and means for actuating said ring.

40. A safe or vault door bolting mechanism comprising a plurality of radially-shiftable bolts, means for dogging said bolts and comprising one or more rotatable bolts, a spindle, means for rotating said bolts, a part of said means mounted upon said spindle and rotatable therewith, means for shifting said part into and out of its operative position and combination-lock mechanism for controlling the shifting of said part.

41. A safe or vault door bolting mechanism comprising a plurality of main bolts, means for dogging said bolts and comprising a bolt penetrating each of said main bolts transversely to the plane of movement thereof, means for operating said dogging-bolts, and a locking-dog for preventing the operation of said operating means at a predetermined period.

42. A safe or vault door bolting mechanism comprising a plurality of main bolts, means for dogging said bolts and comprising a bolt penetrating each of said main bolts transversely of its plane of movement, an annular device for operating said dogging-bolts and means for preventing the operation of said annular device at a predetermined period.

43. A safe or vault door bolting mechanism comprising a plurality of shiftable bolts, means for dogging said bolts and comprising one or more intersecting bolts, rotatable means for operating said intersecting bolts, and a spring-actuated device for preventing the operation of said rotatable means at a predetermined period.

44. A safe or vault door bolting mechanism comprising a plurality of radially-shiftable bolts, means for dogging said bolts and comprising one or more rotatable bolts, rotatable means for operating said rotatable bolts, and means for preventing the operation of said rotatable means at a predetermined period.

45. A safe or vault door bolting mechanism comprising a plurality of shiftable bolts, means for dogging said bolts and comprising one or more intersecting bolts, means for operating said intersecting bolts, means for preventing the operation of said bolt-operating means at a predetermined period, and means for actuating said bolt-operating means and also effective to unlock the same to permit the operation thereof.

46. A safe or vault door bolting mechanism comprising a plurality of shiftable bolts, means for dogging said bolts and comprising one or more rotatable bolts, rotatable means for actuating said dogging-bolts, means for locking said rotatable means against movement, and means for rotating said rotatable means and also effective to unlock the same to permit such rotation.

47. A safe or vault door bolting mechanism comprising a plurality of main bolts, means for dogging said bolts and comprising a bolt penetrating each of said main bolts in a direction transverse to its plane of movement, means for operating all of said dogging-bolts simultaneously, and means for limiting movement of said operating means should the same be improperly operated.

48. A safe or vault door bolting mechanism comprising a plurality of shiftable bolts, means for dogging said bolts and comprising one or more intersecting bolts, means for operating said intersecting bolt or bolts, means for preventing the operation of said operating means, means for controlling the operation of said intersecting bolt-operating means and effective to unlock the same at a predetermined time to permit the operation thereof, and means for limiting the movement of said intersecting bolt-operating means should the same be improperly operated.

49. A safe or vault door bolting mechanism comprising a plurality of shiftable bolts, means for dogging said bolts and comprising one or more intersecting bolts, means for operating said intersecting bolt or bolts, means for preventing the operation of said operating means, means for controlling the operation of said intersecting bolt-operating means and effective to unlock the same at a predetermined time to permit the operation thereof, and a combination-lock mechanism for controlling the manipulation of said last means.

50. A safe or vault door bolting mechanism comprising a plurality of shiftable bolts, dogging means therefor comprising one or more rotatable bolts, a rotatable device for rotating said bolts, and means for limiting the rotation of said device beyond a fixed point.

51. A safe or vault door bolting mechanism comprising a plurality of shiftable bolts, means for dogging said bolts and comprising one or more intersecting bolts, means for operating said dogging-bolts and including gear mechanism and means for insuring the proper meshing of the gearing of said gear mechanism.

52. A safe or vault door bolting mechanism comprising a plurality of shiftable bolts, dogging mechanism therefor and comprising one or more rotatable bolts, a rotatable gear-ring for rotating said bolt or bolts, a spindle, a gear mounted on said spindle, means for shifting said gear into and out of engagement with said gear-ring and means for insuring the proper meshing of said gears.

53. A safe or vault door bolting mechanism comprising a plurality of shiftable bolts, dogging mechanism therefor and comprising one or more rotatable bolts, a rotatable gear-ring for rotating said bolt or bolts, a spindle, a gear mounted on said spindle, means for shifting said gear into and out of engagement with said gear-ring, and means carried by said gear-ring for insuring the proper meshing of said gear and gear-ring.

54. A safe or vault door bolting mechanism comprising a plurality of radially-shiftable bolts, dogging mechanism therefor and comprising a plurality of rotatable bolts, a rotatable gear-ring for rotating said bolts, a spindle, a gear mounted on said spindle, means for shifting said gear into and out of engagement with said gear-ring, and a cam-surface carried by said gear-ring for insuring the proper meshing of said gear and gear-ring.

55. A safe or vault door bolting mechanism comprising a plurality of radially-shiftable bolts, dogging mechanism therefor, comprising a plurality of rotatable bolts, a rotatable gear-ring for rotating said bolts, a spindle, a gear mounted on said spindle, means for shifting said gear into and out of engagement with said gear-ring, and means for preventing the movement of said gear-ring beyond a predetermined position.

56. A safe or vault door bolting mechanism comprising a plurality of radially-shiftable bolts, dogging mechanism therefor comprising a plurality of rotatable bolts, a rotatable gear-ring for rotating said bolts, a spindle, a gear mounted on said spindle, means for shifting said gear into and out of engagement with said gear-ring and means for preventing the movement of said gear-ring beyond a predetermined position said means comprising a stop carried by said ring and effective to engage the gear when the same is not in mesh with said ring.

57. A safe or vault door bolting mechanism comprising a plurality of shiftable bolts, means for dogging said bolts and comprising one or more rotatable bolts, a gear-ring for rotating said bolts, a spindle, a loosely-mounted gear upon said spindle and constituting part of the means for operating the shiftable bolts and carrying a clutch member, a clutch member splined to said spindle and carrying a gear, means for shifting said gear into position to mesh with said gear-ring thereby to rotate the dogging-bolts and to also shift said gear away from said gear-ring and into position to engage its clutch member with the gear-clutch member on said spindle and thereby permit the shiftable bolts to be shifted.

58. A safe or vault door bolting mechanism comprising a plurality of shiftable bolts, means for dogging said bolts and comprising one or more rotatable bolts, a gear-ring for rotating said bolts, a spindle, a gear loosely mounted on said spindle and constituting part of the means for operating the shiftable bolts and carrying a clutch member, a clutch member splined to said spindle and carrying a gear, means for shifting said gear into position to mesh with said gear-ring, and thereby to rotate the dogging-bolts, and to also shift said gear away from said gear-ring and to further shift said gear thereby to have its clutch member engage the loosely-mounted gear-clutch member on said spindle and thereby permit the shiftable bolts to be moved.

59. A safe or vault door bolting mechanism comprising a plurality of shiftable bolts, means for dogging said bolts and comprising one or more rotatable bolts, a gear-ring for rotating said bolts, a spindle, a gear loosely mounted upon said spindle and constituting part of the means for operating said shiftable bolts and carrying a clutch member, a clutch member splined to said spindle and carrying a gear, clutch shifter mechanism for shifting said gear into position to mesh with said gear-ring thereby to rotate the dogging means and to also shift said gear away from said gear-ring to have its clutch member engage the loosely-mounted gear-clutch member on said spindle and thereby permit the shiftable bolts to be moved, and a combination-lock mechanism for controlling said clutch shifter mechanism.

60. A safe or vault door bolting mechanism comprising a plurality of shiftable bolts, means for dogging said bolts and comprising one or more rotatable bolts, a gear-ring for rotating said bolts, a spindle, a gear loosely mounted upon said spindle and constituting part of the means for operating said shiftable bolts and carrying a clutch member, a clutch member splined to said spindle and carrying a gear, means for shifting said gear into position to mesh with said gear-ring thereby to rotate the dogging-bolts and to also shift said gear away from said gear-ring and into position to have its clutch member engage the loosely-mounted gear-clutch member on said spindle and thereby permit the shiftable bolts to be moved, and means carried by said gear-ring for preventing movement thereof beyond the gear mounted upon said spindle when said gear is out of mesh with said gear-ring.

61. A safe or vault door bolting mechanism comprising a plurality of shiftable bolts, means for dogging said bolts and comprising one or more rotatable bolts, a gear-ring for rotating said bolts, a spindle, a gear loosely mounted upon said spindle and constituting part of the means for operating said shiftable bolts and carrying a clutch member, a clutch member splined to said spindle and carrying a gear, means for shifting said gear into position to mesh with said gear-ring thereby to rotate the dogging-bolts and to also shift said gear away from said gear-ring and into position to have its clutch member engage the loosely-mounted gear-clutch member on said spindle and thereby permit the shiftable bolts to be moved and means carried by said gear-ring for insuring the proper meshing of the splined gear with said gear-ring.

62. A safe or vault door bolting mechanism comprising a plurality of shiftable bolts, means for dogging said bolts and comprising one or more rotatable bolts, a gear-ring for rotating said bolts, a spindle, a gear loosely mounted upon said spindle and constituting part of the means for operating said shiftable bolts and carrying a clutch member, a clutch member splined to said spindle and carrying a gear, means for shifting said gear into position to mesh with said gear-ring thereby to rotate the dogging-bolts and to also shift said gear away from said gear-ring and into position to have its clutch member engage the loosely-mounted gear-clutch member on said spindle and thereby permit the shiftable bolts to be moved, and means carried by said gear-ring for maintaining the gear in mesh with such gear-ring during a predetermined period.

63. A safe or vault door bolting mechanism comprising a plurality of shiftable bolts, means for dogging said bolts and comprising one or more rotatable bolts, a gear-ring for rotating said bolts, a spindle, a gear loosely mounted upon said spindle and constituting part of the means for operating said shiftable bolts and carrying a clutch member, a clutch member splined to said spindle and carrying a gear, means for shifting said gear into position to mesh with said gear-ring thereby to rotate the dogging-bolts and to also shift said gear away from said gear-ring and into position to have its clutch member engage the loosely-mounted gear-clutch member on said spindle and thereby permit the shiftable bolts to be moved and a flange carried by said gear-ring for maintaining the gear in mesh with such gear-ring during a predetermined period.

64. A safe or vault door comprising a body and a flange having bolt-openings, bolts shiftable therein, and one or more rotatable dogging-bolts carried by said flange for engaging the shiftable bolts to lock the same against retraction and means for rotating said dogging-bolts.

65. A safe or vault door comprising a body and a flange having bolt-openings, bolts shiftable therein, and one or more rotatable dogging-bolts carried by said flange for engaging the shiftable bolts to lock the same against retraction, and means comprising a rotatable device carried within the flange of said door for rotating said dogging-bolts.

66. A safe or vault door comprising a body and a flange having bolt-openings, bolts shiftable therein, and one or more rotatable dogging-bolts carried by said flange for engaging the shiftable bolts to lock the same against retraction, and means comprising a rotatable gear-ring carried within the flange of said door and in mesh with a pinion or pinions carried by said rotatable bolt or bolts for rotating said dogging means.

67. A safe or vault door comprising a body and a flange having bolt-openings, bolts shiftable therein, and one or more rotatable dogging-bolts carried by said flange for engaging the shiftable bolts to lock the same against retraction, means comprising a rotatable gear-ring carried within the flange of said door and in mesh with a pinion or pinions carried by the said rotatable bolt or bolts for rotating said dogging-bolts, and means for rotating said gear-ring and comprising a spindle and a gear mounted on said spindle.

68. A safe or vault door comprising a body and a flange having bolt-openings, bolts shiftable therein, and one or more rotatable dogging-bolts carried by said flange for engaging the shiftable bolts to lock the same against retraction, means comprising a rotatable gear-ring carried within the flange of said door and in mesh with a pinion or pinions carried by the said rotatable bolt or bolts for rotating said dogging-bolts, means for rotating said gear-ring and comprising a spindle and a gear mounted on said spindle, and means for preventing the rotation of said ring.

69. A chambered safe or vault door having a plurality of locking-bolts and a plurality of rotatable dogging-bolts for locking said locking-bolts against retraction, a rotatable gear-ring working in such chamber and effective to rotate said dogging-bolts, and means for rotating said gear-ring.

70. A chambered safe or vault door having a plurality of locking-bolts and a plurality of rotatable dogging-bolts for locking said locking-bolts against retraction, a rotatable gear-ring working in such chamber and effective to rotate said dogging-bolts, and means comprising a spindle and a gear mounted thereon in mesh with said gear-ring, and means for shifting said gear into and out of mesh with the gear-ring for rotating said gear-ring.

71. A circular, chambered, safe or vault door, having a plurality of radially-shiftable locking-bolts, a plurality of dogging-bolts threaded into said door for engaging said locking-bolts, one for each locking-bolt, each of said dogging-bolts carrying a pinion, a rotatable gear-ring fitted into the chamber of said door and in mesh with said pinions, a spindle, and a gear mounted thereon and in mesh with the gear-ring for rotating the same.

72. A circular, chambered safe or vault door, having a plurality of radially-shiftable locking-bolts, a plurality of dogging-bolts threaded into said door for engaging said locking-bolts, one for each locking-bolt, each of said dogging-bolts carrying a pinion, a rotatable gear-ring fitted into the chamber of said door and in mesh with said pinions, a spindle, a gear mounted thereon and in mesh with the gear-ring for rotating the same and means for shifting said gear into or out of mesh with the gear-ring.

73. A circular, chambered, safe or vault door, having a plurality of radially-shiftable locking-bolts, a plurality of dogging-bolts threaded into said door for engaging said locking-bolts, one for each locking-bolt, each of said dogging-bolts carrying a pinion, a rotatable gear-ring fitted into the chamber of said door and in mesh with said pinions, a spindle, a gear mounted thereon and in mesh with the gear-ring for rotating the same, means for shifting said gear into or out of mesh with the gear-ring, means for locking said gear-ring against movement, and means for unlocking it simultaneously with the shifting of the gear into mesh therewith.

74. A circular, chambered, safe or vault door, having a plurality of radially-shiftable locking-bolts, a plurality of dogging-bolts threaded into said door for engaging said locking-bolts, one for each locking-bolt, each of said dogging-bolts carrying a pinion, a rotatable gear-ring fitted into the chamber of said door and in mesh with said pinions, a spindle, a gear mounted thereon and in mesh with the gear-ring for rotating the same, means for shifting said gear into or out of mesh with the gear-ring, means for locking said gear-ring against movement, and means for unlocking it simultaneously with the shifting of the gear into mesh therewith, said gear-shifting means and means for unlocking the gear having connection one with the other for simultaneous operation.

75. A safe or vault door comprising a body and an integral flange having its interior wall cut away to form a plurality of bearing-faces, a rotatable member fitting within said flange and in engagement with said bearing-faces, and means operated by said rotatable member.

76. A safe or vault door comprising a body and a flange, said flange having parts cut away to form a plurality of bearing-faces, a plurality of shiftable bolts, means for locking said bolts against movement, rotatable means in engagement with said bearing-faces for actuating said locking means and means for operating said rotatable means.

77. A circular safe or vault door having a series of circularly-arranged radially-shiftable simultaneously-operative bolts, a circular series of simultaneously-operative dogging-bolts rotatable into and out of position to lock the radial bolts against movement, one for each of said radial bolts, and means for rotating said dogging-bolts together.

78. A circular safe or vault door having a series of circularly-arranged radially-shiftable simultaneously-operative bolts, a circular series of simultaneously-operative dogging-bolts rotatable into and out of position to lock the radial bolts against movement, one for each of said radial bolts, and means for rotating said dogging-bolts together, said means comprising a rotatable gear-ring carried by the door and in mesh with a pinion carried by each of said rotatable bolts, a spindle, and means for effecting connection between said spindle and gear-ring.

79. A circular safe or vault door having a series of circularly-arranged radially-shiftable simultaneously-operative bolts, a circular series of simultaneously-operative dogging-bolts rotatable into and out of position to lock the radial bolts against movement, one for each of said radial bolts, and means for rotating said dogging-bolts together, said means comprising a rotatable gear-ring carried by the door and in mesh with a pinion carried by each of said rotatable bolts, a spindle, a gear mounted on said spindle and adapted to mesh with said gear-ring, means for shifting said gear into and out of engagement with the gear-ring and means connected with said spindle for operation thereby for shifting the radial bolts after they are unlocked.

80. A safe or vault door bolting mechanism comprising a plurality of main bolts, dogging means therefor comprising one or more bolts adapted to engage one or more of said main bolts, a spindle, means controlled by said spindle for actuating said dogging means, and means also controlled by said spindle for shifting said main bolts, a part of the bolt-operating mechanism being effective in one position to impart movement from the spindle to the dogging-bolt-operating means, and in another position to impart movement from the spindle to the main-bolt-operating means.

81. A safe or vault door bolting mechanism comprising a plurality of main bolts, dogging means therefor comprising one or more bolts adapted to engage one or more of said main bolts, a spindle, means controlled by said spindle for actuating said dogging means, means also controlled by said spindle for shifting said main bolts, a part of the bolt-operating mechanism being effective in one position to impart movement from the spindle to the dogging-bolt-operating means, and in another position to impart movement from the spindle to the main-bolt-operating means, and means for shifting said part into its different positions.

82. A safe or vault door bolting mechanism comprising a plurality of main bolts, dogging means therefor comprising one or more bolts adapted to engage one or more of said main bolts, a spindle, means controlled by said spindle for actuating said dogging means, means also controlled by said spindle for shifting said main bolts, a part of the bolt-operating mechanism being effective in one position to impart movement from the spindle to the dogging-bolt-operating means, and in another position to impart movement from the spindle to the main-bolt-operating means, means for shifting said part into its different positions, and a combination-lock mechanism for controlling said shiftable means.

83. A locking mechanism comprising a bolt, a rotatable dogging-bolt engaging said bolt, and means for operating both of said bolts from a common source.

84. A locking mechanism comprising bolts adapted to project in different directions, a plurality of rotatable dogging-bolts engaging said bolts, and means for operating both of said sets of bolts from a common source.

85. A locking mechanism comprising bolts adapted to project in different directions, a plurality of rotatable dogging-bolts engaging said bolts, and means for operating both of said sets of bolts from a common source, and the bolts of each set together.

86. A locking mechanism comprising bolts adapted to project in different directions, a plurality of rotatable dogging-bolts engaging said bolts transversely thereof, one for each of said bolts, and means for operating both of said sets of bolts from a common source.

87. A locking mechanism comprising locking-bolts, dogging-bolts therefor, a gear-ring for operating said dogging-bolts, and means for operating both said gear-ring and locking-bolts from a common source.

88. A circular safe or vault door having a circular series of locking-bolts, a circular series of dogging-bolts working transversely of and engaging the locking-bolts, a gear-ring for shifting said dogging-bolts, and means for actuating said gear-ring.

89. A safe or vault door bolting mechanism comprising a plurality of main bolts, a plurality of dogging-bolts therefor engaging said main bolts transversely of the plane of movement thereof, means for actuating said dogging-bolts, an actuator, and lock-controlled means for effecting connection between said actuator and said dogging-bolt-actuating means.

90. A safe or vault door bolting mechanism comprising a plurality of main bolts, a plurality of dogging-bolts therefor engaging the main bolts transversely of the plane of movement thereof, a gear-ring for shifting said dogging-bolts, a spindle, and means for effecting connection between said spindle and gear-ring.

91. A safe or vault door bolting mechanism comprising a plurality of swinging radially-shiftable bolts, a worm-wheel pivoted to the inner ends of such bolts, a worm-shaft in engagement with said worm-wheel, a gear fixed to said worm-shaft, a spindle, a gear loosely mounted thereon and in mesh with said worm-shaft gear, a clutch on said spindle and effective to make and break connection between said gear and spindle, and lock mechanism for controlling such connection.

ORVEY PRICE.
WALTER GASTON.

Witnesses:
JAMES H. SULLIVAN,
MORRIS UNDERHILL.